Feb. 3, 1942.  R. R. FITZSIMMONS ET AL  2,271,547
REFRIGERATION
Filed March 4, 1940
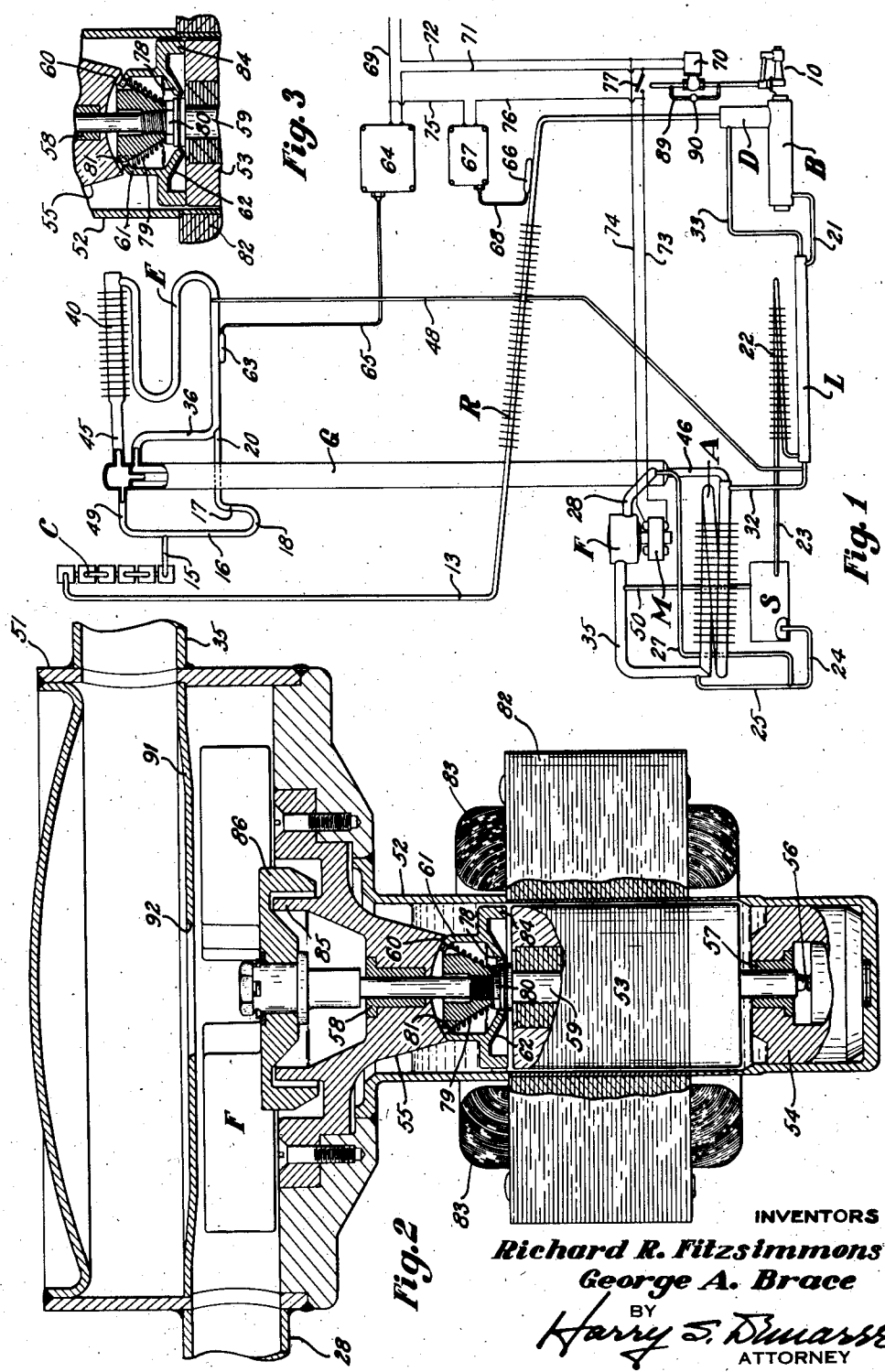
INVENTORS
*Richard R. Fitzsimmons &*
*George A. Brace*
BY
*Harry S. Dumasse*
ATTORNEY Patented Feb. 3, 1942

2,271,547

UNITED STATES PATENT OFFICE 2,271,547

REFRIGERATION

Richard R. Fitzsimmons, Chicago, and George A. Brace, Winnetka, Ill., assignors to The Hoover Company, North Canton, Ohio Application March 4, 1940, Serial No. 322,148

22 Claims. (Cl. 62—5)

This invention relates to the art of refrigeration and more particularly to an improvement in three-fluid absorption refrigerating systems of the type utilizing a power operated device for circulating the fluid mediums normally contained in such apparatuses. The rotating part of the power operated circulating device is supported in a lubricant and a seal is provided between the rotating element and the other portions of the refrigerating apparatus which will prevent escape of lubricant therefrom.

It has been found very advantageous to circulate the fluids in refrigerating systems of the absorption type by means of a small power operated mechanism, preferably a small electric motor operated centrifugal fan. Refrigerating systems of this type operate under extremely high pressures wherefore it is necessary to weld or otherwise securely seal all elements of the apparatus into a unitary whole. Consequently, it has been found most advantageous to utilize a small induction type motor with the rotating element thereof sealed within the system and specifically within a thin walled motor shell around the outside of which is mounted the field windings. Due to the fact that these systems operate under extremely high pressure and are customarily welded together, field servicing is impossible and it is likewise impossible to lubricate the motor after the initial construction of the apparatus without disassembling the system.

In order to solve the lubrication problem the motor rotor shell is preferably filled with a lubricating medium which may be either solid or fluid at atmospheric temperatures. This arrangement provides adequate lubrication for the motor but the pressure in systems of this type varies widely between the "on" and "off" cycle, wherefore the lubricant may become charged with refrigerant at the high pressure prevailing during an "on" cycle. When the apparatus becomes inoperative and the system pressure drops, the refrigerant which has found its way into the lubricant, then tends to boil off or cause foaming which removes the lubricant from the motor shell and distributes the same to other parts of the system in which it cannot perform a lubricating function and also in which it may interfere with proper operation of the system.

Another factor of appreciable importance in this connection results from the fact that the apparatus may be up-ended or placed on its side during shipment and installation or other handling procedures whereby fluid lubricant contained within the motor shell will spill therefrom and will not thereafter be returned to its proper environment. It is also important in systems of this type to energize the heater for the absorption refrigerating machine and the motor for the fluid circulator in proper sequence which depends upon various factors described in detail hereinafter.

Accordingly, it is a principal object of the present invention to provide an absorption refrigerating system of the type including a power operated fluid circulator which is so constructed and arranged as to overcome the difficulties mentioned above.

More specifically it is an object of the present invention to provide an absorption refrigerating system of the three-fluid type utilizing a power operated fluid circulator in which the rotating part of the power unit is supported in a lubricant which may be fluid or solid under non-operating conditions.

It is a further object of the invention to provide a sealing arrangement for a power unit of the type mentioned above which will prevent the lubricant from spilling from the power unit housing during handling; which will prevent discharge of the lubricant from the motor shell by foaming or boiling out of refrigerant vapor during the "off" cycle of the apparatus; which will maintain a hermetic seal between the power unit housing and the remaining portions of the refrigerating system until the pressures in the motor and in the system are substantially balanced; which will relieve the power circulating unit of the objectionable friction load of a running seal during the operative period of the apparatus; and which may be utilized in a proper arrangement of parts to effect a desired control of the refrigerating mechanism.

It is a further object of the present invention to provide a three-fluid absorption refrigerating apparatus having a power operated circulating unit with the rotating part of the power unit at least partially submerged in a lubricant and separated from the balance of the apparatus by a seal which is arranged to be maintained in tightly sealed condition as long as there is an appreciable pressure differential existing between the power unit housing and the remaining part of the refrigerating system and also serves to block rotation of the motor as long as such pressure differential prevails.

It is a further object of the present invention to provide an absorption refrigerating system power unit seal which is maintained in sealed condition during the "off" cycle of the apparatus and which is moved to the open condition as an incident of energization of the system.

It is another object of the present invention to provide an absorption refrigerating apparatus including a power unit provided with a rotating element which is submerged in a lubricant non-fluid at ordinary temperatures and which is so correlated to the control mechanism of the system that the lubricant will act to prevent operation of the circulator prior to the time at which refrigerant vapor has been produced in the boiler and supplied to other portions of the refrigerating mechanism.

Other objects and advantages of the invention will become apparent as the description proceeds when taken in connection with the accompanying drawing in which:

Figure 1 is a diagrammatic representation of an absorption refrigerating apparatus with the motor and control of this invention applied thereto;

Figure 2 is a sectional view of the power unit according to this invention; and

Figure 3 is a view depicting the relation of the parts of the movable seal with the seal in open position.

Referring to Figure 1 of the drawing, there is disclosed a three-fluid absorption refrigerating system comprising a boiler B, an analyzer D, an air-cooled rectifier R, a tubular air-cooled condenser C, an evaporator E, a gas heat exchanger G, a tubular air-cooled absorber A, a solution reservoir S, a liquid heat exchanger L, and a circulating fan F which is driven by an electric motor M.

The above described elements are interconnected by various conduits to form a plurality of gas and liquid circuits constituting a complete refrigeration system to be described in more detail hereinafter.

The refrigerating system will be charged with a suitable refrigerant, such as ammonia, a suitable solvent such as water, and a suitable pressure equalizing medium such as nitrogen.

The boiler B will be heated in a suitable manner as by an electrical heater or a gas burner 10 as may be desired.

The application of heat to the boiler B liberates the refrigerant vapor from the strong solution contained therein. The vapor so liberated passes upwardly through the analyzer D in counterflow relationship to strong solution flowing downwardly through the analyzer. Further refrigerant vapor is generated in the analyzer by the heat of condensation of absorption solution, vaporized in the boiler and condensed in the analyzer. The refrigerant vapor is conducted from the upper portion of the analyzer D to the upper portion of the condenser C through a conduit 13 which includes the air-cooled rectifier R wherein any vapor of absorption solution passing through the analyzer is condensed and returned to the analyzer through the conduit 13.

The refrigerant vapor is liquefied in the condenser by heat exchange relation with atmospheric air and is discharged from the bottom portion thereof through a conduit 15 into a downwardly extending conduit 16. The bottom portion of conduit 16 connects to the bottom portion of an upwardly extending conduit 17 through a U bend 18. The conduit 16 is appreciably longer than the conduit 17 for a purpose to be described later. Conduit 17 opens at its upper end into a conduit 20 which discharges into the evaporator in a manner to be described in more detail hereinafter.

The weak solution formed in the boiler by the generation of refrigerant vapor therefrom is conveyed from the boiler through a conduit 21, the outer pass of liquid heat exchanger L through a precooler 22 and conduit 23 into the solution reservoir S. The weak solution is conveyed from the solution reservoir S through a U-shaped conduit 24 opening into an upwardly extending tube 25 of small diameter, forming a gas lift pump which discharges into the top of the absorber A. It is evident that the top of the absorber is appreciably above the solution level normally prevailing in the boiler-analyzer-reservoir system whereby some means must be provided to elevate the absorption solution to the top of the absorber A. For this purpose, a small bleed conduit 27 is connected to the discharge conduit 28 of the circulating fan F and leads to the junction of the conduits 24 and 25, which is below the solution level normally prevailing in the reservoir whereby the weak solution is elevated to the top of the absorber by gas lift action.

In the absorber the weak solution flows downwardly by gravity in counterflow to the rich pressure equalizing medium refrigerant vapor mixture flowing upwardly therethrough. The refrigerant vapor content of the mixture is absorbed into the absorption solution and the heat of absorption is rejected to the surrounding air by air cooling fins which are mounted on the exterior walls of the absorber conduit. The strong solution formed in the absorber discharges into the conduit 32 which opens into the inner pass of the liquid heat exchanger L. From the inner pass of liquid heat exchanger L, the strong solution is conveyed to the upper portion of the analyzer D by conduit 33 whereby it flows downwardly through the analyzer in counterflow to the rising vapors generated in the boiler.

The weak pressure equalizing medium refrigerant vapor mixture present in the absorber A is taken from the upper portion thereof through the conduit 35 into the suction side of the circulating fan F in which it is placed under pressure and discharged through conduit 28 into the outer pass of the gas heat exchanger G and therefrom through a downwardly extending conduit 36 into the bottom of the evaporator E.

The conduit 20 opens into the bottom of the conduit 36 whereby the liquid refrigerant supplied to the evaporator enters simultaneously with pressure equalizing medium which is placed under pressure by the circulating fan F. The diameter of the conduit of the evaporator is relatively small whereby the pressure equalizing medium flows through it at a relatively high velocity. The rapidly flowing pressure equalizing medium sweeps or drags the liquid refrigerant through the evaporator coil as the refrigerant is diffusing into the pressure equalizing medium to produce refrigeration. In the box cooling portion 40 of the evaporator, the velocity of the pressure equalizing medium is slow by reason of the large diameter of that portion and any remaining liquid refrigerant flows therethrough by gravity as it is evaporating into the pressure equalizing medium. Any liquid refrigerant not evaporated in the evaporator flows by conduit 45, the inner pass of gas heat exchanger G and conduit 46 to the bottom of the absorber A so as not to interfere with the operation of the motor fan unit.

The rich pressure equalizing medium refrigerant vapor mixture formed in the evaporator is conducted therefrom into the inner pass of the gas heat exchanger G through a conduit 45. The opposite end of the gas heat exchanger G communicates with the bottom portion of absorber A through a conduit 46. In the absorber A the rich pressure equalizing medium refrigerant vapor mixture flows upwardly in counterflow to absorption solution whereby the refrigerant vapor content of the mixture is absorbed by the weak solution.

The bottom coil of the evaporator E is provided with a drain conduit 48 which opens into the solution discharge conduit 32. Conduit 48 opens into the top portion of the bottom coil of the evaporator whereby it will not completely drain such conduit. The upper portion of discharge conduit 15 of the condenser is vented through a vent conduit 49 into the inner pass of the gas heat exchanger G. The solution reservoir is vented through a conduit 50 into the suction conduit 35 of the circulating fan.

The circulating fan F places the pressure equalizing medium discharged therefrom under a small pressure in the neighborhood of a pressure of 4½ inches of water over that prevailing in the suction side of the fan. In order to prevent this pressure which also prevails in the conduit 36 from being carried back through the condenser discharge conduit, the condenser and conduit 13 to the analyzer, the conduit 16 is made appreciably longer than the conduit 17 whereby a pressure balancing column of liquid is formed in the conduit 16 which extends above the point of connection between the conduits 17 and 20, a distance sufficient to overcome the pressure produced by the circulating fan in the conduit 36.

The motor fan unit comprises a fan casing 51 and a cylindrical shell 52 forming a housing for the fan F and the motor rotor 53. The motor rotor 53 is rigidly connected to the fan F by a shaft 59 which is suitably supported for rotation by bearing assemblies 54 and 55. The lower bearing assembly 54 comprises a two-part tungsten carbide thrust bearing 56 and a large clearance Babbitt radial bearing 57. The upper bearing assembly 55 also includes a large clearance radial Babbitt bearing 58 and a seat 60 to co-operate with a movable seal or valve member 61 mounted for sliding movements on the shaft 59.

The member 61 is secured to the shaft 59 by means of a flexible metallic or synthetic rubber diaphragm 62 which is bonded at its outer periphery in gas tight relationship to the inner periphery of the flange 84 on the member 61 and is also rigidly secured to the shaft 59 in gas tight relationship thereto by any suitable means such as clamping nut 80. The movable seal or valve member 61 is urged in upward direction by spring 79 and is compelled to rotate with the shaft 59 by means of lugs 81 extending into grooves in the opening through the member 61.

As shown in Figure 3, the interior diameter of the upper opening in the member 61 is somewhat greater than the diameter of that portion of the diaphragm 62 which is rigidly secured to the shaft 59 by nut 80 for a purpose to be hereafter described.

The bearing assembly 55 also includes an upstanding annular rim 85 which extends slightly above the outlet conduit 28 and is surrounded by a throw-off ring 86 which rotates with the shaft 59.

Tightly pressed over the exterior of the shell 52, opposite the rotor 53, is a field stack 82 provided with field coils 83.

The interior of the fan casing 51 is separated into a suction chamber and a pressure chamber by a plate 91 having an opening 92 leading to the suction or eye side of the fan.

A thermostatic bulb 63 is positioned in contact with the lower coil of the evaporator E and is connected to a control device 64 of conventional construction by tube 65. A second thermostatic bulb 66 is positioned in contact with the tube 13 adjacent rectifier R and is connected to a second control device 67 of conventional construction by tube 68. The thermostatic bulbs 63 and 66 and the tubes 65, 68 are filled with a volatile fluid in a well known manner so that the expansion and contraction of the fluid will operate the control devices 64 and 67.

One side of the control device 64 is connected to one side of the power line by a conductor 69 and its opposite side is connected to a magnetically operated gas valve 70 by conductor 71, the opposite side of which is connected to the other side of the power line by conductor 72. Conductors 71 and 72 are connected respectively by conductors 73 and 74 to the opposite sides of the field coil 83. One side of control device 67 is connected to the conductor 69 by conductor 75 and its opposite side is connected to conductor 73 by conductor 76. A manual switch 77 is placed in the conductor 73 between its point of connection to the conductors 76 and 71.

A low flame by-pass 89 by-passes the magnetically operated gas valve 70 to supply a minimum flame to the burner 10. The minimum flame may be regulated by a valve 90 in the minimum flame by-pass 89. The valve 90 may be regulated to supply a minimum flame to the burner 10 of such value as to act as merely a pilot or lighter flame for the burner or it may be regulated to supply sufficient heat to the boiler to maintain it at substantially operating temperature during idle periods.

The shell 52 of the motor is filled with a lubricant to the level shown which lubricant may be fluid at all times or it may be solid at ordinary temperatures and fluid at the operating temperature of the motor. One such lubricant is paraffin which may be had in a wide range of melting points and specific gravity. By mixing paraffin with other lubricants almost any melting point desired may be obtained.

The member 61 is made of magnetic material so that when the field coil 83 is energized, the magnetic flux leakage from the end of the field stack 82 to the rotor 53 will exert a force thereon tending to pull the valve or seal 61 downwardly. The strength of the spring 79 should be so selected that it will exert a force sufficient to overcome the weight of the member 61 and the resistance of the diaphragm 62 by a small amount so that when the motor is de-energized, the valve 61 will be held against its seat 60.

When absorption refrigerating apparatus of the type under consideration stands idle for long periods of time, for instance in a 70 degree room the internal pressure goes down to approximately 270 pounds per square inch. When the apparatus is in operation, the pressure rises to approximately 325 to 345 pounds per square inch, depending upon the operating conditions, such as the ambient temperature and the amount of energy supplied to the boiler during idle periods.

In absorption refrigerating apparatus of the type using a pressure equalizing medium, the pressures throughout all parts of the system are substantially equalized during operation and therefore only a small power unit is required for circulating the mediums in their circuits. Since the force exerted on the valve or seal 61 by the magnetic flux leakage of such small power unit would of necessity be small, the valve or seal 61 is so made as to be positively opened as the pressure builds up within the apparatus.

Figure 3 shows the relative positions of the parts of the seal or valve 61 so as to illustrate how this is accomplished. The inner diameter of the seat 60 is shown as greater than the exterior diameter of the nut 80 which attaches the diaphragm 62 to the shaft 59. Now if a pressure is built up on the interior of the seal 61 including the space between the diaphragm 62 and the seal this pressure will exert an equal force in all directions. Since the nut 80 is rigid with the shaft 59 and therefore immovable, the pressure exerted on this area will have no effect, tending to move the diaphragm 62 or the member 61. However, since the area under pressure in a downward direction is greater than that in an upward direction there will be an unbalanced force tending to move the seal 61 downwardly due to the reaction thereon by the force exerted on the unsupported portion of the diaphragm 62. Immediately the seal is broken, the pressures will be equalized on opposite sides of the seal but since the seal or valve only moves a few thousandths of an inch, it will contact the rotor 53 and be held against it in opposition to the spring 79 by magnetic flux leakage so long as the field coil 83 remains energized. When the field coil is de-energized the spring 79 will immediately close the seal.

In order to protect the diaphragm 62 against the pressure inside the shell 52 over that in the fan chamber 51, when the machine remains idle for long periods, the seal or valve member 61 is extended inwardly as shown in 78 so as to leave a slight space between it and the nut 80. Thus the area of the unsupported portion of the diaphragm against upward pressure is very small and the total pressure thereon will as a consequence be very small. It can thus be seen that the diaphragm 62 can easily withstand the maximum difference in pressure which may be encountered.

As soon as the system is de-energized, the valve 61 will be seated against its seat 60. Now as the system cools off, the pressure in the fan casing 51 will go down, but since the valve 61 is closed, the pressure in the shell 52 will be maintained.

Referring to Figure 2, the reactions on member 61 will then be as follows: The pressure in the shell 52 will act in an upward direction on an annular area formed by the external diameters of the flange 84 and the nut 80 and in a downward direction on an annular area formed by the external diameters of flange 84 and the valve 61 itself. The latter area is obviously less than the former and the forces exerted on the smaller area will be balanced.

The pressure in the casing 51 will act in a downward direction on an annular area formed by the external diameters of the nut 80 and the valve 61 itself. Since the pressure on this latter area in an upward direction is greater than in a downward direction, the total unbalanced force tending to seat the valve 61, will be the difference in pressures in the shell 52 and the casing 51 multiplied by the annular area formed by the external diameters of the nut 80 and the valve 61 itself.

Now as the pressure in the system goes down a considerable force will be exerted, forcing the valve 61 against its seat 60, which will operate to positively block the rotor against rotation until the pressures on opposite sides of the valve become substantially equalized.

If the shell 52 is filled with a lubricant, solid at ordinary temperatures and fluid at the operating temperature of the motor, the valve 90 will be set to supply a minimum or pilot flame to the burner 10. The switch 77 will then be closed. When the control 64 calls for refrigeration, the motor and the valve 70 will be simultaneously energized. It will take some time for the boiler to heat up sufficiently to supply refrigerant vapor to the condenser but since the rotor 53 is blocked by the solid lubricant, the motor will not operate until the lubricant has melted. The melting point of the lubricant should be selected relative to the heating effect of the motor field and the heating rate of the boiler so that the lubricant will be melted by the time refrigerant vapor is being supplied to the condenser. By this time the pressures on opposite sides of the diaphragm 62 will have become equalized and the seal 61 will be held against the rotor by the magnetic flux leakage. This will result in a condition in which the motor begins operation at the same time liquid refrigerant is being supplied to the evaporator E and the seal 61 will be free of the seat 60 so that no frictional drag by the seal will be applied to the rotor 53.

If the strength of coil 83 is not sufficient to move the seal 61 downwardly, the pressure in the fan chamber 51 will continue to build up above that in the shell 52 and force the member 61 downwardly as explained above.

When the control 64 operates to de-energize the burner and motor, the valve or seal 61 will immediately close due to the action of the spring 79. As the pressure in the system is slowly reduced, below that in the shell 52, the member 61 is pressed forcibly against the seat 60 as explained above, thus assuring that the pressure in the shell 52 will be maintained and therefore no refrigerant vapor will boil out of the oil in the shell 52 and that the original charge of oil in the shell will be retained therein for indefinite periods.

Since the motor is never energized during shipment or other handling operations, the valve or seal 61 will remain closed during such times and the oil in the shell 52 cannot escape therefrom. The liquid mediums in other parts of the apparatus cannot get into the shell 52 to dilute the oil therein. Any liquid medium that may collect in the fan chamber 51 will be thrown off by the ring 86, immediately the motor begins operation and be drained away through conduits 27 and 28 to the solution circuit so that it cannot enter the shell 52 when the valve or seal 61 is opened. If the shell 52 is filled with a lubricant which is fluid at all times and the valve 90 is set to deliver a minimum or pilot flame to the burner 10, the switch 77 should be open. When the control 64 calls for refrigeration, the valve 70 will be energized to supply a maximum flame to the burner 10 for operating conditions but since the switch 77 is open the motor will not be energized. The burner 10 will continue to supply heat to the boiler and eventually hot refrigerant vapors will pass through the rectifier R and expand the fluid in the bulb 66 and operate the control 67 to energize the field coil 83. By this time the pressure in the fan chamber 51 will have become equalized with that in the shell 52 and the valve or seal 61 will be opened as soon as the motor is energized. At the same time liquid refrigerant will be supplied to the evaporator E so that the circulation of the mediums will be delayed until liquid refrigerant is being supplied to the evaporator.

It is to be pointed out that even if the switch 77 is left closed the motor cannot begin operation until the pressures on opposite sides of the seal 61 are equalized since the pressure of the seal 61 against the seat 60 will operate to block the rotor as explained above. The only result would be a slight wasting of the electrical energy supplied to the motor while the boiler is heating up.

The delay of the operation of the motor until refrigerant is being supplied to the evaporator is important since circulation of the mediums prior to that time would decrease the efficiency of the apparatus. The circulation of the cold solution from the absorber to the boiler would have the effect of cooling the boiler and thus extending the time it would take to bring the boiler to an operating temperature since this cold solution would also have to be heated. The circulation of weak, warm solution from the boiler to the absorber would also have the effect of heating the absorber and thus throwing additional heat load thereon which must be dissipated before the absorber can efficiently absorb refrigerant vapor from the inert medium refrigerant vapor mixture circulating therethrough. Since the inert medium being circulated at this time contains little refrigerant vapor to be absorbed, the solution leaving the absorber and returning to the boiler will be comparatively weak which will result in a further decrease in the efficiency of the apparatus.

If warm inert medium is circulated from the absorber to the evaporator before liquid refrigerant is being supplied to the evaporator this warm gas acts to heat the evaporator before any liquid refrigerant is produced to cool it by the evaporation of the refrigerant. The apparatus would thus operate to pump heat from the boiler to the evaporator and further reduce the efficiency of the apparatus.

With the switch 77 open as described above, when the control 64 operates to de-energize the burner 10, the boiler will remain hot for sometime thereafter and will still supply refrigerant vapor to the condenser. The motor, however, is still energized and will continue to circulate the mediums until the rectifier cools sufficiently for the fluid in the bulb 66 to contract and operate the control 67 to de-energize the motor. This is also important since the liquid refrigerant supplied to the evaporator during the cooling off period of the boiler would otherwise be wasted.

When the motor is de-energized the valve or seal 61 will immediately close and prevent boiling off of vapor from the oil in the shell 52 and consequently the original charge of oil will be retained in the shell.

If the valve 90 is set to supply sufficient heat to the boiler to maintain it at substantially the operating temperature during idle periods, the switch 77 should be closed so that the control 64 will simultaneously energize the valve 70 and the motor.

Since under the above conditions, the boiler is at substantially operating temperature, it is ready to supply refrigerant vapor to the condenser immediately the valve 70 is opened to apply a maximum flame to the burner 10. The pressures on opposite sides of the seal 61 will also be substantially equalized so that the motor is ready for operation to circulate the mediums in the apparatus coincidentally with the supply of liquid refrigerant to the evaporator.

The valve or seal 61 could be rigidly attached to the shaft 59, the thrust bearing 56 mounted on a spring so as to press the valve or seal against the seat 60 with the rotor positioned slightly above the field stack 82 so that when the coil 83 is energized, the whole rotor will be pulled downwardly against the action of the spring so as to open the valve or seal 61 when the motor is energized. This modification would have the advantage that a stronger pull would be exerted to open the seal than in the modification of Figure 2. It has also the advantage that if a solid lubricant is used, the valve could not be opened until the lubricant is melted so that the motor and burner 10 could be simultaneously energized and the valve or seal would not be opened until the pressures on opposite sides thereof had become substantially equalized.

It has the disadvantage, however, that the higher pressure in the shell 52 would not act to forcibly press the valve against its seat. Thus when a lubricant is used which is fluid at all times, the switch 77 should be maintained in open position to assure that the valve would not be opened until the pressures on opposite sides thereof had become equalized, as explained above.

By supporting the rotor 53 in a liquid medium such as lubricant, the rotor centers itself as it reaches its operating speed. This is due to the fact that if the rotor is off-center at the beginning of its operation, the liquid will tend to rotate with the rotor and be drawn between the rotor 53 and the shell 52 at the point where the rotor is closest to the shell and move the rotor away from the shell at that point. This action will continue until the rotor is completely centralized. It is to be noted that the space between the rotor and shell when the rotor is centralized is very small and may be only a few thousandths of an inch.

The fact that the action of the lubricant automatically centers the rotor renders it possible to make the radial Babbitt bearings 57 and 58 with a much larger clearance between their bearing surfaces and that of the shaft 59 than would otherwise be possible. Thus the bearing surfaces are only in contact when the rotor is starting and the wear thereon will be negligible.

The buoyant effect of the lubricant will also lighten the load on the thrust bearing 56 and thereby reduce the wear thereon. As the radial bearings are out of contact with the shaft during operation a much quieter motor will result.

From the foregoing it can be seen that this invention provides an absorption refrigerating apparatus of the pressure equalized type, utilizing a power unit for circulating the mediums, in which a seal is provided between the power unit rotor and fan whereby the lubricant in the rotor shell cannot escape into other parts of the apparatus, either during operation or during shipment or other handling operations, in which the liquid mediums in the apparatus cannot enter the rotor shell to dilute the lubricant therein, in which the operation of the power unit is delayed until liquid refrigerant is being supplied to the evaporator and in which the operation of the power unit is continued after the boiler is de-energized so that the mediums will be circulated so long as liquid refrigerant is being supplied to the evaporator.

While we have shown but one embodiment of our invention, it is to be understood that this embodiment is to be taken as illustrative only and not in a limiting sense. We do not wish to be limited to the specific structure shown and described but to include all equivalent variations thereof except as limited by the scope of the claims.

We claim:

1. An absorption refrigerating apparatus of the type having higher operating pressures than that prevailing therein during idle periods comprising a boiler, power operated means for circulating the mediums in the apparatus, said power means including a motor rotor separated from the remainder of the apparatus by a partition having a valved opening, means for simultaneously energizing the boiler and power means, and means for holding the valve in closed position until the pressures on opposite sides thereof have equalized.

2. An absorption refrigerating apparatus having a higher operating pressure than that prevailing in the apparatus during idle periods comprising a heater for the boiler, and power operated means for circulating the mediums in the apparatus, said power means comprising a motor fan unit in which the motor rotor and fan are separated by a partition having an opening, movable seal means mounted on said rotor and cooperating with a seat surrounding said opening for closing said opening, means responsive to a difference in pressure on opposite sides of said opening for holding the seal against its seat, means for energizing the heater, and means responsive to a condition incident to the energization of the heater for energizing the motor and moving the seal away from its seat.

3. An absorption refrigerating apparatus having high internal pressures during operation and low internal pressures during idle periods, in combination with a heater for the boiler and a motor fan unit for circulating the mediums in the apparatus, said motor fan unit comprising a vertical casing having a sealable opening between the motor rotor and fan and said rotor being submerged in a lubricant, means for energizing said heater, and means responsive to a condition incident to the energization of the heater for opening the sealable opening.

4. An absorption refrigerating apparatus having high internal pressures during operation and low internal pressures during idle periods, in combination with a heater for the boiler and a motor fan unit for circulating the mediums in the apparatus, said motor fan unit comprising a vertical casing having a sealable opening between the motor rotor and fan and said rotor being in contact with a lubricant, means for energizing said heater, and means responsive to a condition incident to the energization of the heater for energizing the motor and opening the sealable opening.

5. An absorption refrigerating apparatus comprising a motor fan unit for circulating the mediums in the apparatus, said motor fan unit including a casing having a sealable opening between the motor rotor and fan, means for energizing the apparatus, and means responsive to a condition incident to the energization of the apparatus for opening said sealable opening.

6. An absorption refrigerating apparatus of the type having pressure variations between running and idle periods comprising a boiler, power means for circulating the mediums in the apparatus, said power means including a motor rotor separated from the remainder of the apparatus by a partition having a valved opening, means for simultaneously energizing the boiler and power means and means selectively actuatable to energize the boiler prior to the energization of the power means and means for holding the valve in closed position until the pressures on opposite sides thereof have equalized.

7. An absorption refrigerating apparatus comprising a circuit for liquid mediums, a motor fan unit for circulating said mediums, said motor fan unit comprising a casing having a sealable opening between the motor rotor and fan and being normally positioned in that part of the circuit inaccessible to liquid mediums but subject to being flooded with liquid medium during shipment or other handling operations, and means responsive to the energization of the apparatus for opening said sealable opening.

8. An absorption refrigerating apparatus comprising a circuit for liquid mediums, a motor fan unit for circulating the liquid mediums in its circuit, comprising a vertically positioned motor fan housing with the fan chamber positioned above the motor rotor and being positioned in that part of the circuit normally inaccessible to the liquid mediums but subject to being flooded during shipment or other handling operations, said motor rotor being submerged in part in a lubricant and a seal between the motor rotor and fan, and means responsive to the energization of the apparatus for opening said seal whereby said seal closes the motor rotor casing from the other parts of the apparatus during idle periods and is open during running periods.

9. An absorption refrigerating apparatus of the type subject to internal pressure variations between operating and idle periods in combination with a motor fan unit for circulating the mediums in the apparatus, means responsive to said pressure variations for blocking the rotor and being so constructed as to release the rotor when the internal pressure reaches a pre-determined value.

10. The method of operating absorption refrigerating apparatus of the type using a motor fan unit for circulating the mediums in the apparatus comprising energizing the apparatus, blocking the motor rotor against operation and utilizing a condition of the mediums within the system resulting from the energization of the apparatus for releasing the motor rotor.

11. The method of controlling the operation of an absorption refrigerating apparatus of the type using power means for circulating the mediums in the apparatus comprising energizing the apparatus including said power means, delaying the operation of the power means and utilizing the rising pressure incident to the energization of the apparatus for terminating the period of delay in the operation of the power means.

12. An absorption refrigerating apparatus comprising circuits for a liquid and gaseous medium in the apparatus, a motor fan unit for circulating said mediums, said motor fan unit being positioned in that part of the circuit inaccessible to liquid mediums during normal operation, but subject to being flooded by liquid medium during shipment or other handling operations and comprising an upper fan housing and lower rotor shell separated by a partition having a valved opening, for housing the fan and motor rotor, and means responsive to the energization of the motor for opening the valve opening.

13. An absorption refrigerating apparatus in which the total pressure within the system rises during operation over that prevailing in the apparatus during idle periods, in combination with power means for circulating the mediums in the apparatus, said power means comprising a casing for housing a motor rotor and fan with an opening therebetween, a valve for closing the opening, means responsive to the energization of the motor tending to open the valve and means responsive to a difference in pressure between the motor and fan casing for opposing said first mentioned means whereby the valve remains closed until the pressures are equalized on opposite sides thereof.

14. An absorption refrigerating apparatus in which the total pressures within the apparatus rise during operation over that which prevails in the apparatus during idle periods, in combination with a motor fan unit for circulating the mediums in the apparatus, said motor fan unit comprising a motor fan casing with a movable seal between the motor rotor and fan, means responsive to the de-energization of the motor for closing said seal, means responsive to a reduction in pressure in the fan chamber for blocking the rotor until the pressures on opposite sides of the seal are equalized, and means responsive to the energization of the rotor for opening said seal after the pressures on opposite sides thereof have equalized.

15. An absorption refrigerating apparatus having high internal pressures during operation and low internal pressures during idle periods, in combination with a motor fan unit for circulating the mediums in the apparatus, said motor fan unit comprising a vertical casing having a sealed opening between the motor rotor and fan, and means responsive to an equalization of pressures on opposite sides of said opening for opening said seal.

16. An absorption refrigerating apparatus comprising a circuit for a liquid medium, a motor fan unit for circulating the liquid medium in its circuit, comprising a vertically positioned motor fan housing with the fan chamber positioned above the motor rotor and being normally positioned in that part of the circuit inaccessible to the liquid mediums but subject to being flooded during shipment or other handling operations, said motor rotor being at least partially submerged in a lubricant and a seal between the motor rotor and fan whereby the oil cannot get out of the motor rotor casing and the liquid mediums cannot get in.

17. An absorption refrigerating apparatus comprising a circuit for a liquid medium, a motor fan unit for circulating the liquid medium in its circuit, comprising vertically positioned motor fan housing with the fan chamber positioned above the motor rotor and being positioned in that part of the circuit normally inaccessible to the liquid mediums and liable to being flooded during shipment or other handling operations, said motor rotor being supported in a lubricant and a seal between the motor rotor and fan, and means responsive to a pressure difference on opposite sides of the seal for closing the seal and for opening the seal when said pressures are equalized, whereby the motor rotor is sealed from other parts of the apparatus until the pressure therein has reached that in the motor rotor casing.

18. An absorption refrigerating apparatus in combination with a motor fan unit for circulating the mediums in the apparatus, said apparatus being subject to internal pressure variations between operating and idle periods, said motor fan unit comprising a vertical casing in which the fan is positioned above the motor rotor and the rotor is contacted by a lubricant which absorbs the mediums in the apparatus under pressure, and a sealable opening between the motor rotor casing and the fan chamber which is closed during idle periods and open during running periods, whereby the oil will be retained in the motor rotor casing and not to be subject to the boiling off of the mediums absorbed therein when the pressure of the apparatus goes down during idle periods.

19. An absorption refrigerating apparatus including a boiler in combination with a heater for the boiler and a motor fan unit for circulating the mediums in the apparatus, said motor fan unit comprising a casing having a sealable opening between the motor rotor and fan, means for energizing said heater, and means responsive to a condition incident to the energization of the heater for energizing the motor and opening the sealable opening, said last mentioned means being so constructed and arranged as to maintain the energization of the motor for an appreciable time after the de-energization of the heater.

20. An absorption refrigerating apparatus comprising a circuit for mediums in the apparatus, power means for circulating said mediums, said power means comprising a motor fan unit in which the motor rotor is submerged in a lubricant, and a seal between the motor rotor and fan, said seal being constructed to open when such a motor is energized and the pressure is equalized on opposite sides thereof.

21. An absorption refrigerating apparatus of the continuous type comprising, a liquid container having an opening in its upper portion, said opening forming the sole communication between said container and the remainder of the apparatus, a valve for closing said opening and means responsive to the energization of said apparatus for opening said valve and holding it open during the normal operation of said apparatus whereby liquid will be retained in said container when the apparatus is not operating and there will be free communication between the container and the remainder of the apparatus when the apparatus is in operation.

22. An absorption refrigerating apparatus of the continuous type having a normal upright operating position, said apparatus including a liquid containing portion having an upward opening when said apparatus is in its normal upright position, said opening forming the sole communication between said liquid containing portion and the remainder of the apparatus, means for closing said opening and means responsive to the energization of said apparatus for actuating said closing means to hold said closing means in open position during the period when said apparatus is energized.

RICHARD R. FITZSIMMONS.
GEO. A. BRACE.